US007005769B1

(12) United States Patent
Fisher et al.

(10) Patent No.: US 7,005,769 B1
(45) Date of Patent: Feb. 28, 2006

(54) SLEEVE BEARING ASSEMBLY WITH ACOUSTIC/VIBRATION DECOUPLING AND ENDPLAY ADJUSTMENT

(75) Inventors: Bryan Todd Fisher, Appin (CA); Stan Simpson, St. Thomas (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/951,388

(22) Filed: Sep. 28, 2004

(51) Int. Cl.
H02K 7/08 (2006.01)
H02K 5/16 (2006.01)
H02K 7/10 (2006.01)

(52) U.S. Cl. ......................... 310/90; 310/89
(58) Field of Classification Search .................. 310/89, 310/90, 42; 384/204–214, 295, 428, 439
See application file for complete search history.

(56) References Cited

U.S. PATENT DOCUMENTS

| | | | |
|---|---|---|---|
| 1,323,626 A | 12/1919 | Garman | |
| 1,918,690 A | 7/1933 | Engelhardt | |
| 2,448,500 A | 8/1948 | Turner | 308/72 |
| 2,606,947 A | 8/1952 | Happe | 172/36 |
| 3,156,838 A * | 11/1964 | Winther | 310/42 |
| 3,302,048 A | 1/1967 | Gray | 310/90 |
| 3,444,409 A | 5/1969 | Latta et al. | 310/239 |
| 3,463,954 A | 8/1969 | Latta | 310/90 |
| 3,510,707 A * | 5/1970 | Stone et al. | 310/112 |
| 3,966,278 A | 6/1976 | Lewis | 308/72 |
| 4,335,323 A * | 6/1982 | Kebbon et al. | 310/40 R |
| 4,355,250 A | 10/1982 | Langdon | 310/88 |
| 4,452,541 A | 6/1984 | Carpenter | 384/223 |
| 4,599,006 A | 7/1986 | Abel | 384/136 |
| 4,783,608 A | 11/1988 | Gruber et al. | 310/90 |
| 5,358,341 A | 10/1994 | Blaettner et al. | 384/204 |
| 5,494,356 A * | 2/1996 | Strobl | 384/204 |
| 5,497,039 A | 3/1996 | Blaettner et al. | 310/51 |
| 5,677,584 A | 10/1997 | Keck | 310/90 |
| 5,905,320 A | 5/1999 | Periyathamby et al. | 310/89 |
| 5,914,550 A | 6/1999 | Periyathamby et al. | 310/91 |
| 5,917,258 A | 6/1999 | Kershaw et al. | 310/51 |
| 5,945,756 A | 8/1999 | Periyathamby et al. | 310/89 |
| 5,969,447 A | 10/1999 | Periyathamby et al. | 310/89 |
| 5,977,666 A | 11/1999 | Horski et al. | 310/51 |
| 6,252,321 B1 | 6/2001 | Fisher et al. | 310/89 |
| 2002/0053836 A1 | 5/2002 | Nakano et al | 310/51 |
| 2005/0017585 A1 * | 1/2005 | Simpson et al. | 310/89 |

* cited by examiner

Primary Examiner—Tran Nguyen

(57) ABSTRACT

An electric motor 10 has an armature assembly 12 coupled with a rotatable shaft 16; a clamshell frame assembly 18 including first and second halves joined together, each of the first and second halves includes locking structure 32; and a pair of bearing assemblies 22 carried by the frame assembly. Each bearing assembly includes a sleeve bearing 24 and an elastomer structure 26. The elastomer structure has a main body 30 substantially surrounding the sleeve bearing, and a pair of tabs 28 extending from the main body in opposing directions. Each bearing assembly 22 is operatively associated with an end of the shaft to permit rotation of the shaft. The locking structure 32 engages the tabs 28 of an associated elastomer structure to retain the bearing assembly with respect to the frame assembly, with the elastomer structures reducing transmission of noise from the sleeve bearings to frame assembly.

11 Claims, 3 Drawing Sheets

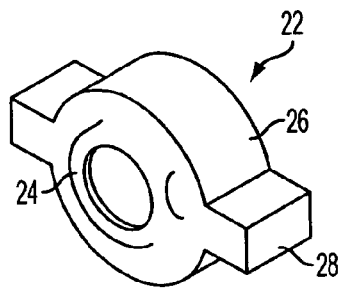
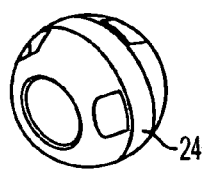
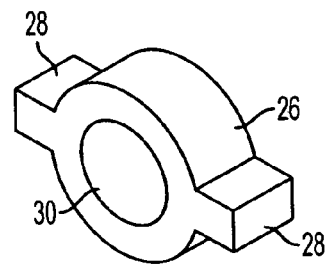
FIG. 2　　　　FIG. 3　　　　FIG. 4
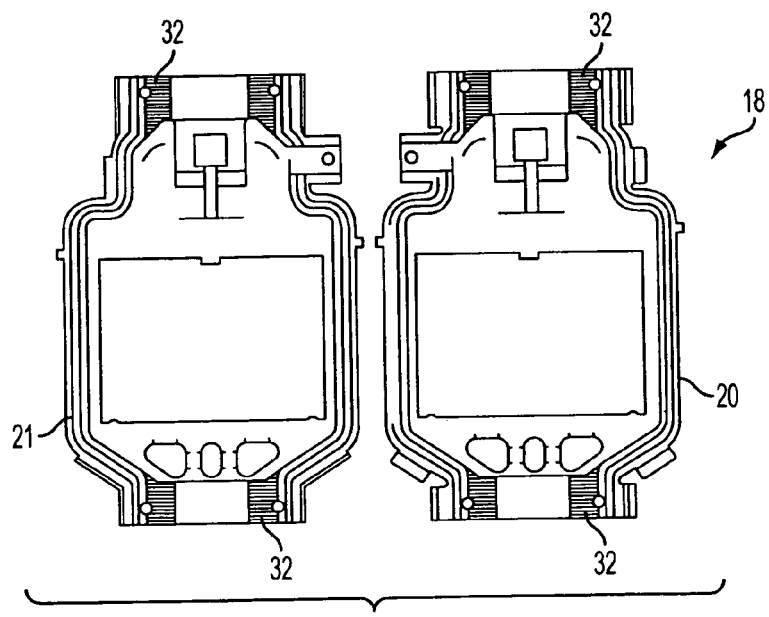
FIG. 5
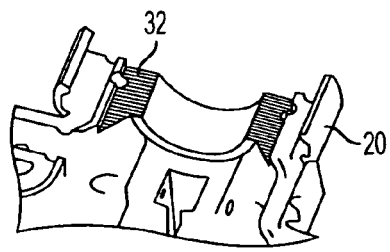
FIG. 6

SLEEVE BEARING ASSEMBLY WITH ACOUSTIC/VIBRATION DECOUPLING AND ENDPLAY ADJUSTMENT

FIELD OF THE INVENTION

The invention relates to a sleeve bearing assembly of an electric motor for reducing bearing noise and for adjusting endplay of an armature of the motor.

BACKGROUND OF THE INVENTION

In any rotating electrical device bearing noise is a significant contributor to the overall motor noise. In an electric motor with one or two sleeve bearings that are used for both axial thrust surfaces and cylindrical running surfaces, the bearing related noise consists of four main components:
1) Bearing/Shaft Friction Noise created by the interface of two sliding surfaces
2) Commutator Brush Noise/vibration transmitted through the commutator to the shaft to the bearing
3) Cogging Torque Noise transmitted from the cogging lamination in the magnetic circuit to the shaft to the bearing
4) Axial thrust surface noise caused by the interaction of the axial thrust washer and the bearing All of these noises associated with the bearing are amplified when considering the noise/vibration path to the adjacent structure. Bearing/structure noise is created by vibration transferred to the adjacent resonating structure. Thus, there is a need to reduce these noises.

SUMMARY OF THE INVENTION

An object of the invention is to fulfill the need referred to above. In accordance with the principles of the present invention, this objective is achieved by providing an electric motor having an armature assembly coupled with a rotatable shaft; a clamshell frame assembly including first and second halves joined together, each of the first and second halves includes locking structure; and a pair of bearing assemblies carried by the frame assembly. Each bearing assembly includes a sleeve bearing and an elastomer structure. The elastomer structure has a main body substantially surrounding the sleeve bearing, and a pair of tabs extending from the main body in opposing directions. Each bearing assembly is operatively associated with an end of the shaft to permit rotation of the shaft. The locking structure engages at least a portion of the tabs of an associated elastomer structure to retain the bearing assembly with respect to the frame assembly, with the elastomer structures reducing transmission of noise from the sleeve bearings to frame assembly.

In accordance with another aspect of the invention, a method of setting endplay in an electric motor is provided. The motor has an armature assembly coupled to a rotatable shaft having ends; a clamshell frame assembly including first and second halves joined together, each of the first and second halves including locking structure; and a pair of bearing assemblies to permit rotation of the shaft, each bearing assembly including a sleeve bearing and an elastomer structure. The elastomer structure has a main body substantially surrounding the sleeve bearing, and a pair of tabs extending from the main body in opposing directions. The method includes placing a bearing assembly onto each end of the shaft of the armature assembly, placing the bearing assemblies and armature assembly into the first half of the frame assembly such that at least a portion of each of the tabs contacts the locking structure of the first half of the frame assembly, moving each bearing assembly away from the associated end and toward thrust surfaces of the armature to a desired endplay location, placing the second half of the frame assembly so that the locking structure thereof contacts at least a portion of each of the tabs, and clamping the first and second halves of the fame assembly together such that the locking structure engages the tabs to retain the bearing assembly at the desired endplay location.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 2 is a perspective view of a bearing assembly of the motor of FIG. 1.

FIG. 3 is a perspective view of a sleeve bearing of the bearing assembly of FIG. 2.

FIG. 4 is perspective view of an elastomer structure of the bearing assembly of FIG. 2.

FIG. 5 is plan view of clamshell frame assembly halves of the motor of FIG. 1.

FIG. 6 is a partial perspective view of an end of a clamshell frame assembly half showing locking teeth.

DETAILED DESCRIPTION OF THE EXEMPLARY EMBODIMENT

Figure 1:
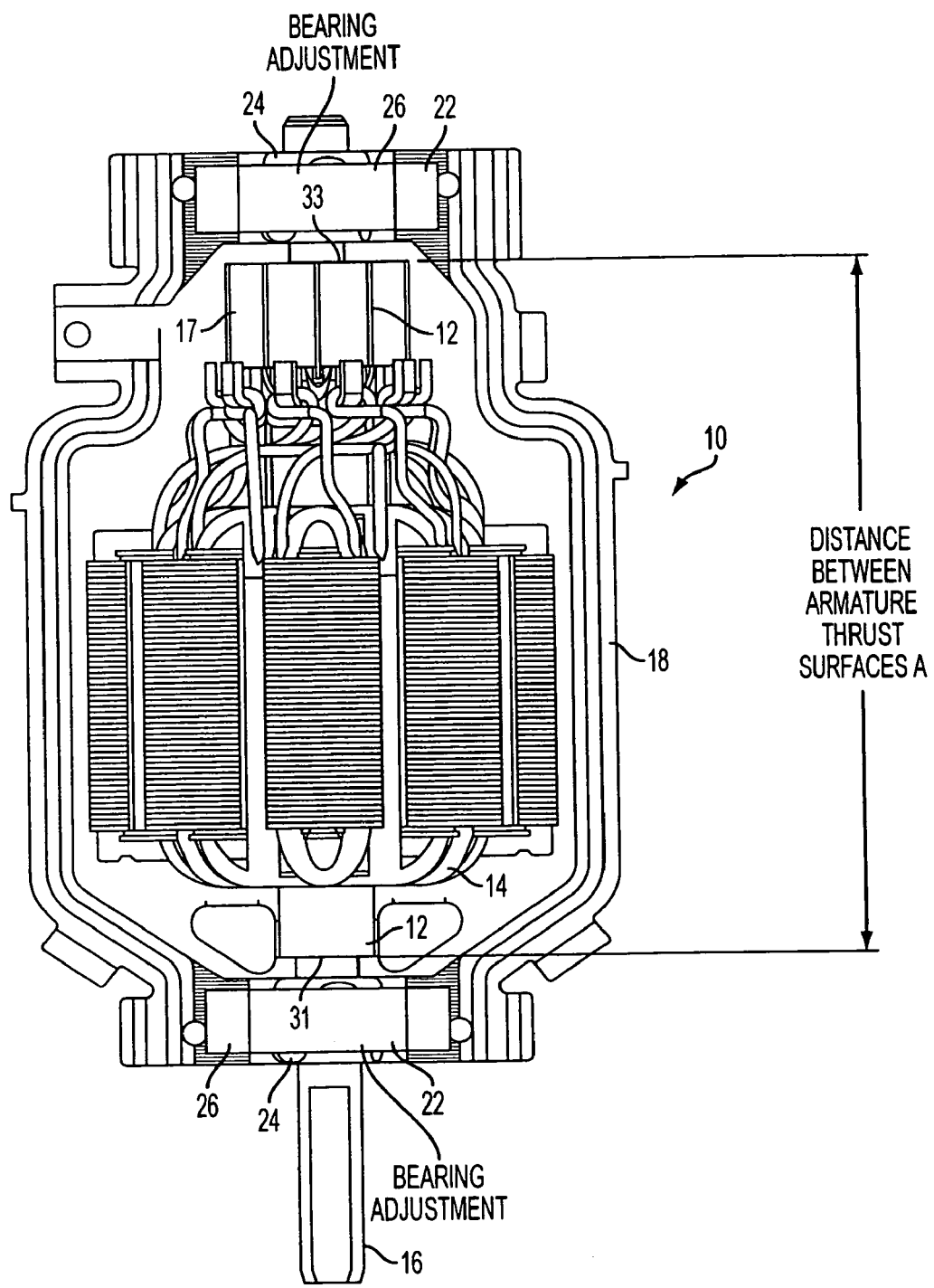
FIG. 1 is view of a clamshell type DC motor provided in accordance with the principles of the invention and shown with half of the clamshell frame assembly removed to show bearing assemblies.

With reference to FIG. 1, a clamshell-type electric motor is shown, generally indicated at 10, with half of the clamshell frame assembly 18 removed for clarity of illustration. The motor 10 is preferably configured for automotive HVAC systems. The electric motor 10 includes an armature assembly 12 having windings 14. The armature assembly 12 is coupled with a shaft 16 to rotate the shaft with respect to the fame assembly 18 in the conventional manner. The armature assembly 12 includes a commutator 17 and he motor 10 includes the conventional a brush card assembly (not shown) having brushes to engage the commutator 17 and conduct electric current to the windings 14. Permanent magnets (not shown) are disposed about the armature assembly 12 and are carried by the clamshell frame assembly 18. As shown in FIG. 5, the clamshell frame assembly 18, preferably molded from plastic, has a first half 20 and a mating second half 22 that are joined to define the frame assembly of the motor 10. The plastic material for the frame assembly 18 is preferably glass-filled NYLON®.

As shown in FIG. 2, a bearing assembly, generally indicated at 22, includes a sleeve bearing 24 (FIG. 3) for receiving an end of the shaft 16 to permit rotation of the shaft with respect to the frame assembly 18, and an elastomer structure 26 (FIG. 4) that substantially surrounds the sleeve bearing 24. A main body 30 of the elastomer structure 26 can be over-molded with respect to the generally spherical periphery of the sleeve bearing 24 or provided about the periphery sleeve bearing in a press-fit arrangement. The elastomer structure 26 includes a pair of tabs 28 extending in opposing directions from the generally hollow-cylindrical main body 30 of the elastomer structure 26. Each tab 28 is preferably of parallelepiped configuration. As shown in FIGS. 5 and 6, each of the first and second halves of the frame assembly 18 includes locking structure, preferably in the form of teeth 32 molded therein. The locking teeth 32 are constructed and arranged to engage at least portions of the tabs 28 of an associated elastomer structure 26 to retain the bearing assembly 22 with respect to the frame assembly 18, as will be explained more fully below.

This embodiment de-couples the bearing assembly and frame assembly noise utilizing the following features:

1) The bearing 24 is assembled into the elastomer structure 26 by means of over-molding or press fit. The resulting bearing assembly 22 is placed into a clamshell frame assembly 18 of the motor and acts as a decoupling device to reduce the transmitted acoustic energy to the frame assembly. Due to the inherent damping properties of the elastomer material, very little acoustic energy is transmitted to the motor housing (frame assembly).

2) Furthermore, there are two tabs 28 molded into the elastomer structure 26. These tabs function as gripping surfaces in the clamshell frame assembly 18. This allows the bearing assembly 22 to be held in and area that is not on the outside diameter of the bearing, further decoupling the bearing-frame assembly noise. The diametrical fit to the outside diameter can be reduced or none existent allowing acoustic energy to travel radial out from the bearing to the tabs only to the frame assembly. The tabs 28 also limit the surface contact between the bearing and the frame assembly.

3) When the armature assembly 12 is axially displaced within the desired endplay, the armature thrust surface contacts the bearing thrust surface and creates a "knock" sound. This bearing assembly 22 decouples this noise and any axial thrust noise from being amplified by the motor structure.

The second purpose of this invention is to adjust the motor endplay. Electric motors that utilize two sleeve bearings require endplay adjustment. Endplay can be defined as the axial movement of the armature assembly 12 after assembly. This is controlled by the difference in the resultant assembled dimension A (FIG. 1) between the thrust surfaces 31, 33 of the armature assembly 12 and the distance between the inner thrust surfaces of the two bearings in the stator. Endplay in HVAC motors is usually controlled from 0.1 mm to 1 mm to eliminate axial knocking sounds when the armature experiences axial vibration. This invention provides a means to set the desire armature assembly endplay upon assembly of the motor. The following is a description of the sequence of steps used to set the endplay in the motor of the illustrated embodiment.

1. A bearing assembly 22 is placed onto the shaft 16 at each end of the armature assembly 12. The armature assembly already contains the thrust surfaces 31, 33 (FIG. 1).

2. This assembly of the armature assembly 12 and bearing assembly 22 is placed in one of the halves of the clamshell frame assembly 18.

3. The bearing assemblies 22 are pushed inwardly toward the armature thrust surfaces 31 and 33 to the desired endplay.

Figure 7:
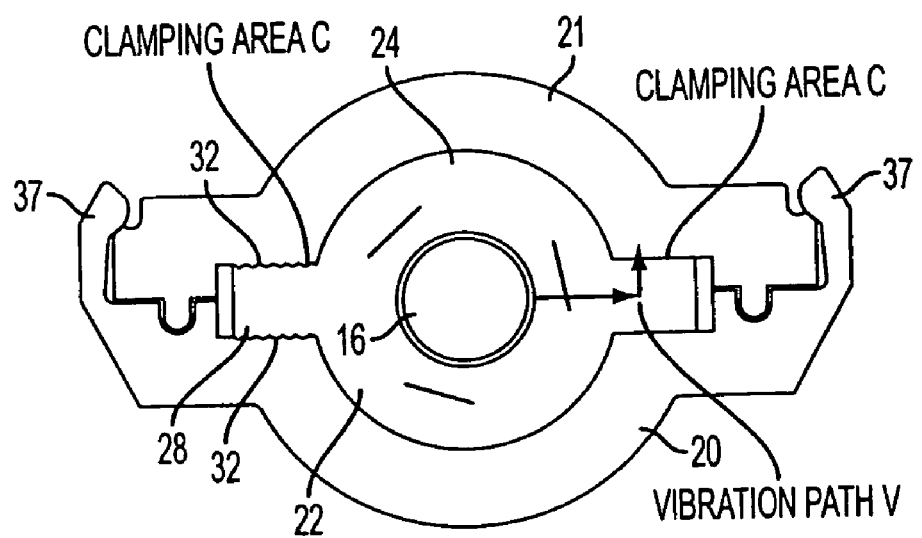
FIG. 7 is an end view of a final assembly of a motor of the invention showing a clamping area and a vibration path.

4. The second half of the clamshell frame assembly is assembled by clamping the first and second halves of the frame assembly 18 together. With reference to FIG. 7, clamping can be performed, for example, by spring members 37 on the first half 20 of the frame assembly that engage and clamp on the second half 22 of the frame assembly. The clamshell/elastomer interface surfaces (in the example shown, the tabs 28) are configured to grab the elastomer and hold the endplay that was set in step 3. In the embodiment the teeth 32 engage the elastomer structure 26. The teeth 32 essentially dig into the elastomer and retain the bearing assembly 22. Other means of gripping could be plastic spring tabs, interference fit or any means for clamping an elastomer between two components.

Endplay can be adjusted at only one end of the motor but, with both ends being adjustable, the armature position can be adjusted in the motor as well as the endplay.

FIG. 7 shows an end view of the motor in final assembly, showing clamping area C on tabs 28 and a vibration path V through the tabs 28.

The bearing assembly 22 applies to all electric motors that utilize sleeve bearings.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An electric motor comprising:
   an armature assembly coupled with a rotatable shaft,
   a clamshell frame assembly including first and second halves joined together, each of the first and second halves includes locking structure, and
   a pair of bearing assemblies carried by the frame assembly, each bearing assembly including a sleeve bearing and an elastomer structure, the elastomer structure having a main body substantially surrounding the sleeve bearing, and a pair of tabs extending from the main body in opposing directions, each bearing assembly being operatively associated with an end of the shaft to permit rotation of the shaft,
   wherein the locking structure engages at least a portion of the tabs of an associated elastomer structure to retain the bearing assembly with respect to the frame assembly, with the elastomer structures reducing transmission of noise from the sleeve bearings to frame assembly.

2. The motor of claim 1, wherein the locking structure includes teeth defied in each of the first and second halves of the frame assembly.

3. The motor of claim 1, wherein the main body of each elastomer structure is molded over a periphery of an associated sleeve bearing.

4. The motor of claim 1, wherein the main body of each elastomer structure is press-fitted over a periphery of an associated sleeve bearing.

5. The motor of claim 1, wherein the main body of the elastomer structure is of generally hollow-cylindrical configuration and each of the tabs is of parallelepiped configuration.

6. An electric motor comprising:
   an armature assembly coupled with a rotatable shaft,
   a clamshell frame assembly including first and second halves joined together, each of the first and second halves includes means for locking, and a pair of bearing assemblies carried by the frame assembly, each bearing assembly including a sleeve bearing and elastomer structure, the elastomer structure having a main body substantially surrounding the sleeve bearing, and a means for engaging the means for locking, each bearing assembly being operatively associated with an end of the shaft to permit rotation of the shaft, wherein the means for locking engages the means for engaging of an associated elastomer structure to retain the bearing assembly with respect to the frame assembly, with the elastomer structures reducing transmission of noise from the sleeve bearings to frame assembly.

7. The motor of claim 6, wherein the means for locking includes teeth defied in each of the first and second halves of the frame assembly.

8. The motor of claim 6, wherein the main body of each elastomer structure is molded over a periphery of an associated sleeve bearing.

9. The motor of claim 6, wherein the main body of each elastomer structure is press-fitted over a periphery of an associated sleeve bearing.

10. The motor of claim 6, wherein the main body of each elastomer structure is of generally hollow-cylindrical configuration and the means for engaging is a pair of tabs extending in opposing directions from the main body of each elastomer structure.

11. The motor of claim 10, wherein each tab is of parallelepiped configuration.

* * * * *